United States Patent
Okaya et al.

(10) Patent No.: US 12,515,772 B2
(45) Date of Patent: Jan. 6, 2026

(54) SUBMERSIBLE VESSEL

(71) Applicant: KAWASAKI JUKOGYO KABUSHIKI KAISHA, Kobe (JP)

(72) Inventors: Noriyuki Okaya, Kobe (JP); Fumitaka Tachinami, Kobe (JP); Yuki Kaga, Kobe (JP); Yusuke Okimura, Kobe (JP); Satoshi Hashimoto, Kobe (JP); Kaoru Koyano, Kobe (JP); Osamu Sato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 622 days.

(21) Appl. No.: 17/947,586

(22) Filed: Sep. 19, 2022

(65) Prior Publication Data

US 2023/0009872 A1    Jan. 12, 2023

Related U.S. Application Data

(63) Continuation of application No. PCT/JP2021/010499, filed on Mar. 16, 2021.

(30) Foreign Application Priority Data

Mar. 19, 2020  (JP) .............................. 2020-049608

(51) Int. Cl.
*B63G 8/00*  (2006.01)

(52) U.S. Cl.
CPC ........ *B63G 8/001* (2013.01); *B63G 2008/002* (2013.01)

(58) Field of Classification Search
CPC .............. B63G 8/001; B63G 2008/002; B63G 2008/004; B63C 11/52; F16L 1/265
See application file for complete search history.

(56) References Cited

U.S. PATENT DOCUMENTS

| | | | |
|---|---|---|---|
| 9,108,321 | B2 | 8/2015 | Emoto et al. |
| 10,272,980 | B2 * | 4/2019 | Abdellatif ............ G01N 29/041 |
| 11,530,018 | B2 * | 12/2022 | Cherami ................. B63C 11/52 |

(Continued)

FOREIGN PATENT DOCUMENTS

| | | | |
|---|---|---|---|
| CN | 103926448 B | * | 9/2016 |
| JP | 2012-245568 A | | 12/2012 |

(Continued)

*Primary Examiner* — Anthony D Wiest
(74) *Attorney, Agent, or Firm* — Oliff PLC

(57) ABSTRACT

A submersible vessel includes: a hull; a propulsor that propels the hull; a front sensor that sequentially detects locations of an inspection target in front of the hull; a controller that controls the propulsor such that the hull passes through above the detected locations; a movable arm attached to an arm reference point of the hull; an inspection tool at the movable arm that inspects the inspection target; and a position detector that acquires positional information including a position, attitude, or speed of the hull. Based on the information from the position detector, the controller estimates a pass-through position of the arm reference point after a predetermined time. The controller controls the movable arm such that before the time elapses, a positional relation between the arm reference point and inspection tool becomes a positional relation between the estimated pass-through position and a target point on or above each location.

3 Claims, 2 Drawing Sheets

(56) References Cited

U.S. PATENT DOCUMENTS

2014/0230713 A1  8/2014  Kimura et al.
2021/0155330 A1  5/2021  Mukaida et al.

FOREIGN PATENT DOCUMENTS

| JP | 2013-067358 A | 4/2013 |
| JP | 5806568 B2 | 11/2015 |
| JP | 2016-159662 A | 9/2016 |
| JP | 2019-182214 A | 10/2019 |

* cited by examiner

SUBMERSIBLE VESSEL

CROSS-REFERENCE TO RELATED APPLICATION

The present application is a bypass continuation of PCT Filing PCT/JP2021/010499, filed Mar. 16, 2021, which claims priority to JP 2020-49608, filed Mar. 19, 2020, both of which are incorporated by reference in their entirety

BACKGROUND OF THE INVENTION

1. Field of the Invention

The present disclosure relates to a submersible vessel that inspects an elongated inspection target disposed on a water bottom.

2. Description of the Related Art

Elongated facilities, such as pipelines laid on a water bottom, can be efficiently inspected by using a submersible vessel. The submersible vessel that performs the inspection includes an inspection tool and a movable arm that positions the inspection tool at an arbitrary position (see Japanese Laid-Open Patent Application Publication No. 2013-67358). To move the inspection tool along the inspection target, while making the submersible vessel sail, a positional relation between the inspection tool and the inspection target may be detected, and the movable arm may be controlled such that the positional relation becomes constant.

SUMMARY OF THE INVENTION

A submersible vessel according to one aspect of the present disclosure is a submersible vessel including: a hull; a propulsor that propels the hull; a front sensor that sequentially detects locations of an elongated inspection target in front of the hull, the inspection target being disposed on a water bottom; a controller that controls the propulsor such that the hull passes through above the detected locations; a movable arm attached to an arm reference point of the hull; an inspection tool that is disposed at the movable arm and inspects the inspection target; and a position detector that acquires positional information including at least one of a position, an attitude, or a speed of the hull. Based on the positional information acquired by the position detector, the controller estimates a pass-through position of the arm reference point after a predetermined time. The controller controls the movable arm such that before the predetermined time elapses, a positional relation between the arm reference point and the inspection tool becomes a positional relation between the estimated pass-through position and a target point on or above each location.

DESCRIPTION OF THE PREFERRED EMBODIMENTS

Entire Structure

Figure 1:
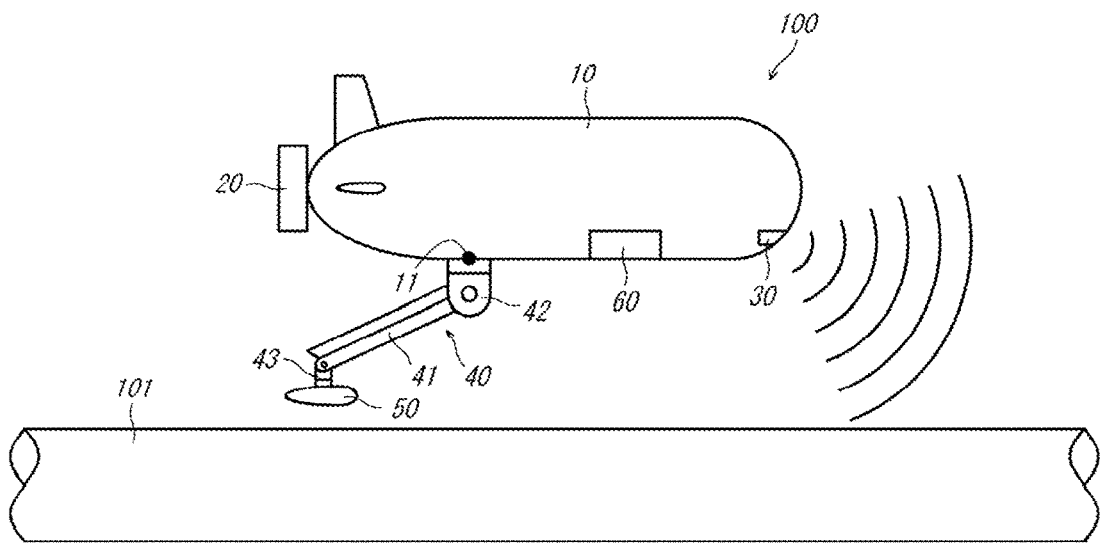
FIG. 1 is a side view of a submersible vessel.

Hereinafter, a submersible vessel 100 according to an embodiment will be described. First, an entire configuration of the submersible vessel 100 will be described. FIG. 1 is a side view of the submersible vessel 100. The submersible vessel 100 according to the present embodiment inspects an elongated inspection target 101 disposed on a water bottom. One example of the inspection target 101 is a pipeline.

As shown in FIG. 1, the submersible vessel 100 includes a hull 10, a propulsor 20, a front sensor 30, a movable arm 40, an inspection tool 50, and a position detector 60. The hull 10 is a base portion of the submersible vessel 100, and various devices are attached to the hull 10.

The propulsor 20 is a device that propels the hull 10. The propulsor 20 includes propulsion structures and a rudder that changes the route of the hull 10. Examples of the propulsion structures include: a main propulsion thruster that moves the hull 10 forward; a vertical thruster that moves the hull 10 in an upper-lower direction; and a horizontal thruster that moves the hull 10 in a left-right direction. The propulsor 20 is not limited to the above configuration and may include, for example, a swing thruster that can change a direction in which thrust is generated.

The front sensor 30 is a device that sequentially detects locations of the inspection target 101 (a position of the inspection target 101) in front of the hull 10. The detection of the front sensor 30 is performed at a predetermined sampling interval (for example, 20 milliseconds). The front sensor 30 is disposed at the hull 10 and performs the detection during the propulsion of the hull 10. The front sensor 30 of the present embodiment is a so-called multibeam sonar. However, the front sensor 30 may be a shape recognition laser or may be a combination of the multibeam sonar and the shape recognition laser.

The movable arm 40 is a device that positions the inspection tool 50 at an arbitrary position. A base end portion of the movable arm 40 is attached to the hull 10, and the inspection tool 50 is disposed at a tip portion of the movable arm 40. A portion of the hull 10 to which the movable arm 40 is attached is referred to as an "arm reference point." The position of an arm reference point 11 is not especially limited. The arm reference point 11 of the present embodiment is located at a rear portion of the hull 10 and behind the front sensor 30. A positional relation between the arm reference point 11 and the inspection tool 50 can be adjusted by controlling the movable arm 40.

The movable arm 40 includes: a parallel link 41; a first joint 42 located between the parallel link 41 and the hull 10; and a second joint 43 located between the parallel link 41 and the inspection tool 50. However, the movable arm 40 is not limited to the above configuration and may include, for example, parallel links. Moreover, instead of the parallel link 41, the movable arm 40 may include a coupler whose positional relation with the hull 10 or the inspection tool 50 is not limited.

The inspection tool 50 is a device that inspects the inspection target 101. The inspection tool 50 of the present embodiment is an imaging camera (for example, a TV camera) that takes an image of the inspection target 101. Instead of or in addition to the imaging camera, the inspection tool 50 may include, for example, one or both of: an anticorrosion inspector that inspects the degree of deterioration of an anticorrosion treatment (for example, anticorrosion painting) over the entire length of the pipeline; and a thickness inspector that inspects the thickness of the pipeline to inspect the degree of corrosion and the presence or absence of damage.

The position detector 60 is a device that acquires positional information including the position (an X-axis direction position, a Y-axis direction position, and a Z-axis direction position) of the hull 10, the attitude (angles around an X-axis, a Y-axis, and a Z-axis) of the hull 10, and the speed (an X-axis direction speed, a Y-axis direction speed, and a Z-axis direction speed, and angular speeds around the X-axis, the Y-axis, and the Z-axis) of the hull 10. The position detector 60 of the present embodiment is an inertial navigation system (INS) and acquires the positional information by using an acceleration sensor and a gyro sensor. However, the position detector 60 may be a device other than the inertial navigation system. Moreover, the positional information may include at least one of the position, attitude, or speed of the hull 10.

Configuration of Control System

Figure 2:
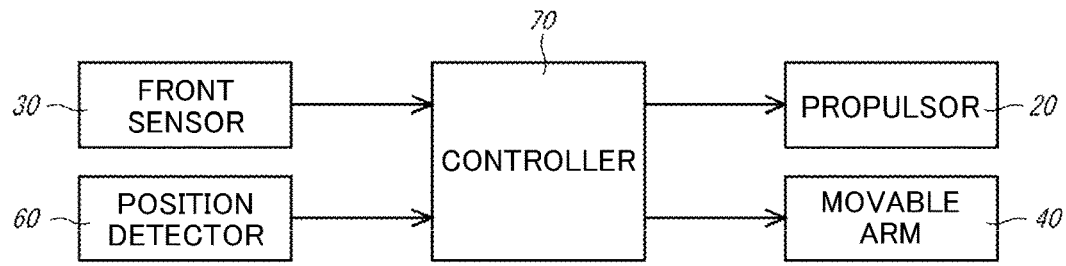
FIG. 2 is a block diagram of a control system of the submersible vessel.

Next, the configuration of a control system of the submersible vessel 100 will be described. FIG. 2 is a block diagram of the control system of the submersible vessel 100. As shown in FIG. 2, the submersible vessel 100 according to the present embodiment includes a controller 70. The controller 70 includes a processor, a volatile memory, a non-volatile memory, an I/O interface, etc. The non-volatile memory of the controller 70 stores a below-described sail program, a below-described follow program, and various data, and the processor of the controller 70 performs calculation processing based on the programs by using the volatile memory.

The controller 70 is electrically connected to the front sensor 30 and the position detector 60. The controller 70 can acquire the location of the inspection target 101 from the front sensor 30 and can acquire the positional information from the position detector 60. Moreover, the controller 70 is electrically connected to the propulsor 20 and the movable arm 40 and can transmit a control signal to the propulsor 20 and the movable arm 40 to control the propulsor 20 and the movable arm 40. In the present embodiment, a time interval (hereinafter referred to as an "update interval") at which the controller 70 acquires the location of the inspection target 101 and the positional information is 20 milliseconds, and a time interval (hereinafter referred to as a "command interval") at which the controller 70 outputs the control signal to the movable arm 40 is 20 milliseconds.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Sail Program

Figure 3:
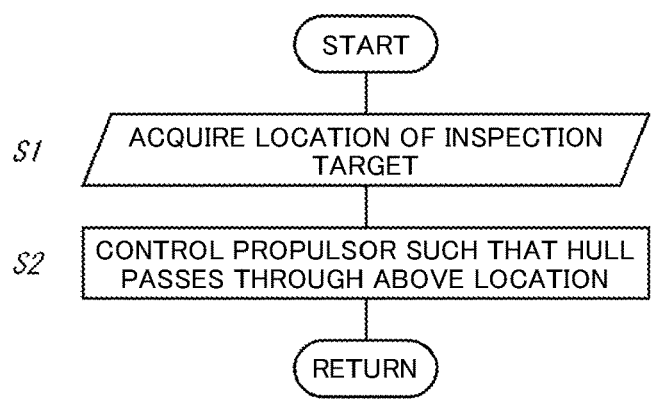
FIG. 3 is a flow chart of a sail program.
Figure 4:
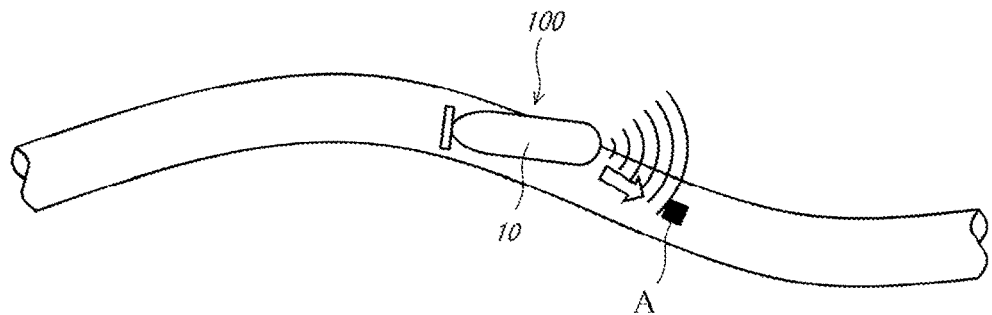
FIG. 4 is a diagram for explaining movements of the submersible vessel when the sail program is executed.

Next, the sail program executed by the controller 70 will be described. The sail program is a program by which the hull 10 sails along the inspection target 101. FIG. 3 is a flow chart of the sail program. As shown in FIG. 3, when the sail program starts, the controller 70 first acquires the location of the inspection target 101 (Step S1). The location can be acquired from the front sensor 30. FIG. 4 is a diagram for explaining the movements of the submersible vessel 100 when the sail program is executed. In Step S1, the controller 70 acquires, for example, a position shown by a sign A in FIG. 4 as the location (herein, the controller 70 acquires only one location).

Next, the controller 70 controls the propulsor 20 such that the hull 10 passes through above the locations (Step S2). In the present embodiment, the hull 10 is propelled toward above the location acquired by the controller 70. In Step S2, for example, the controller 70 propels the hull 10 toward above the position shown by the sign A which is the location in FIG. 4 (see a white arrow in FIG. 4). After Step S2, the controller 70 returns to Step S1 and repeats the respective steps. With this, the hull 10 can move along the inspection target 101.

Follow Program

Figure 5:
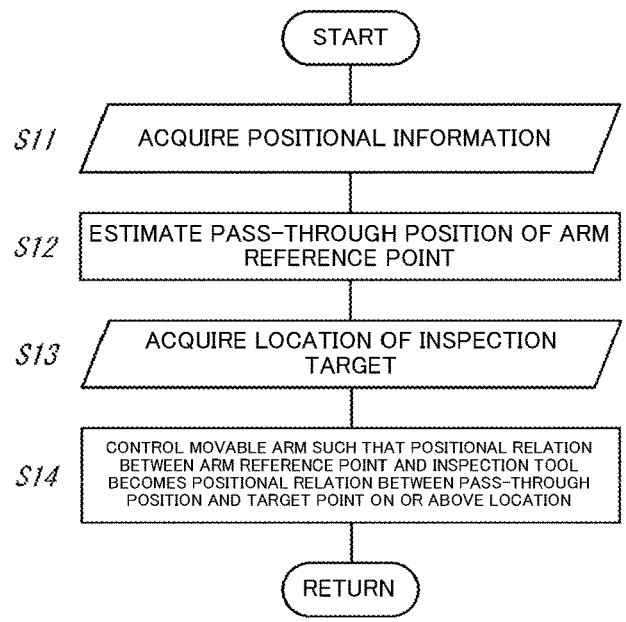
FIG. 5 is a flow chart of a follow program.

Next, the follow program executed by the controller 70 will be described. The follow program is a program that makes the inspection tool 50 follow the inspection target 101. FIG. 5 is a flow chart of the follow program. The follow program is executed in parallel with the above-described sail program. As shown in FIG. 5, when the follow program starts, the controller 70 first acquires the positional information (the position, attitude, and speed of the hull 10) (Step S11). The positional information can be acquired from the position detector 60.

Figure 6:
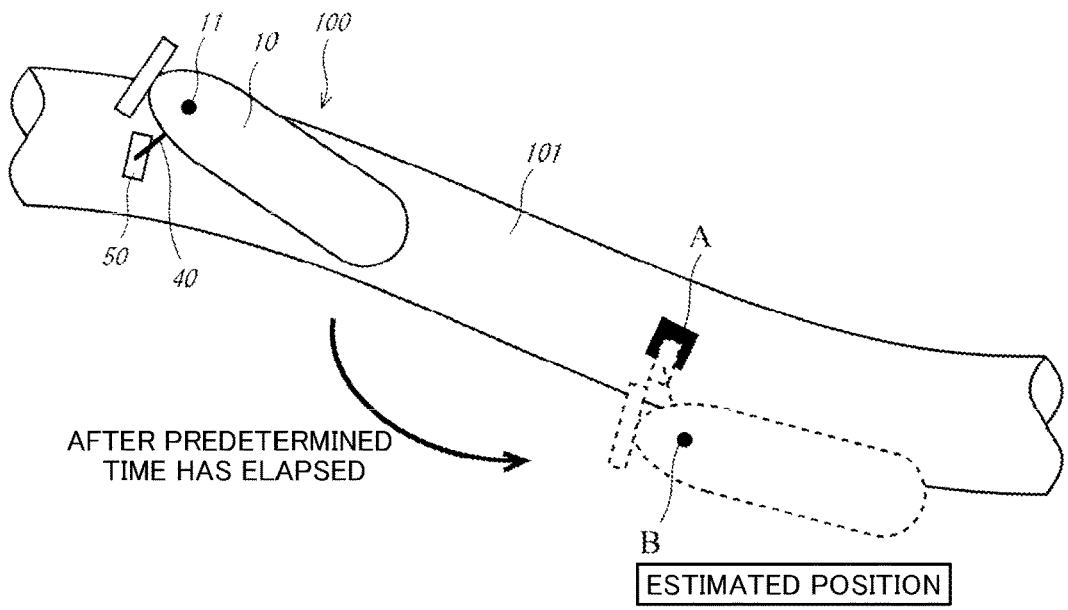
FIG. 6 is a diagram for explaining the movements of the submersible vessel when the follow program is executed.

Next, based on the positional information, the controller 70 estimates a pass-through position of the arm reference point 11 after a predetermined time (herein, the predetermined time is 20 milliseconds but is not limited to this) (Step S12). FIG. 6 is a diagram for explaining the movements of the submersible vessel 100 when the follow program is executed. In Step S12, as the pass-through position of the arm reference point 11 after the predetermined time, the controller 70 estimates, for example, a position shown by a sign B in FIG. 6. The position of the submersible vessel 100 shown by broken lines in FIG. 6 is an estimated position of the submersible vessel 100 after the predetermined time.

In Step S12, the pass-through position of the arm reference point 11 after the predetermined time is estimated on the assumption that the hull 10 is maintained in a latest state. To be specific, when the latest ones among the positions, attitudes, and speeds of the hull 10 acquired by the position detector 60 are respectively referred to as a "latest position," a "latest attitude," and a "latest speed," the pass-through position of the arm reference point 11 after the predetermined time is estimated on the assumption that the hull 10 moves for the predetermined time from the latest position at the same speed as the latest speed while maintaining the latest attitude. However, the pass-through position of the arm reference point 11 after the predetermined time may be estimated by a different method. For example, the pass-through position of the arm reference point 11 after the predetermined time may be estimated without considering the angular speed of the hull 10.

Next, the controller 70 acquires the location of the inspection target 101 (Step S13). As described above, the location of the inspection target 101 can be acquired from the front sensor 30. In Step S13, as the location, the controller 70 acquires, for example, the position shown by the sign A in FIG. 6.

Next, the controller 70 controls the movable arm 40 such that before the above-described predetermined time (20 milliseconds) elapses, the positional relation between the arm reference point 11 and the inspection tool 50 becomes a positional relation between the estimated pass-through position (B) and a target point on or above the location (A) (Step S14). With this, at a time point after the above-described predetermined time has elapsed, the inspection tool 50 can be located at the target point on or above the location.

The target point may be set on an upper surface of the inspection target 101 or may be set at a position upwardly away from the upper surface of the inspection target 101 by a predetermined distance. Moreover, the location in Step S14 may be a latest location acquired by the controller 70 or may be a location other than the latest location. The selection of the location depends on the update interval of the location, the dimension of the hull 10, the speed of the hull 10, and the like.

After Step S14, the controller 70 returns to Step S11 and repeats the respective steps. With this, the inspection tool 50 can move above the inspection target 101. In addition, according to the present embodiment, since the inspection tool 50 can be positioned at an appropriate position in advance, the followability of the inspection tool 50 with respect to the inspection target 101 improves.

Modified Example

The foregoing has described the follow program when the update interval of the location of the inspection target 101, the update interval of the positional information, and the command interval of the movable arm 40 are equal to each other (20 milliseconds). However, when each of the update interval of the positional information and the command interval of the movable arm 40 is shorter than the update interval of the location of the inspection target 101, a below-described "virtual" location is set, and with this, the followability of the inspection tool 50 with respect to the inspection target 101 can be improved. Details are as below.

Herein, it is assumed that the update interval of the location of the inspection target 101 is 20 milliseconds, and each of the update interval of the positional information and the command interval of the movable arm 40 is 5 milliseconds. In this case, the controller 70 sets three virtual locations between the adjacent locations. The virtual locations can be set on a straight line connecting the adjacent two locations. However, the virtual locations may be set by a different method.

Next, the controller 70 acquires the positional information and estimates, based on the acquired positional information, the pass-through position of the arm reference point 11 after the predetermined time (herein, the predetermined time is 5 milliseconds but is not limited to this). Moreover, the controller 70 controls the movable arm 40 such that before the above predetermined time elapses, the positional relation between the arm reference point 11 and the inspection tool 50 becomes the positional relation between the estimated pass-through position and the target point on or above the virtual location (or the target point on or above the location). By repeating the above steps, the inspection tool 50 can move above the inspection target 101. According to this control method, the position of the inspection tool 50 can be further finely adjusted. As a result, the followability of the inspection tool 50 with respect to the inspection target 101 improves.

Operational Advantages

The submersible vessel according to the present embodiment is a submersible vessel including: a hull; a propulsor that propels the hull; a front sensor that sequentially detects locations of an elongated inspection target in front of the hull, the inspection target being disposed on a water bottom; a controller that controls the propulsor such that the hull passes through above the detected locations; a movable arm attached to an arm reference point of the hull; an inspection tool that is disposed at the movable arm and inspects the inspection target; and a position detector that acquires positional information including at least one of a position, an attitude, or a speed of the hull. Based on the positional information acquired by the position detector, the controller estimates a pass-through position of the arm reference point after a predetermined time. The controller controls the movable arm such that before the predetermined time elapses, a positional relation between the arm reference point and the inspection tool becomes a positional relation between the estimated pass-through position and a target point on or above each location.

According to this configuration, since the position of the inspection tool can be appropriately adjusted before the inspection tool passes through above the location, the followability of the inspection tool with respect to the inspection target improves.

Moreover, in the submersible vessel according to the present embodiment, the controller acquires a latest position, a latest attitude, and a latest speed of the hull from the position detector, and the controller estimates the pass-through position of the arm reference point after the predetermined time on an assumption that the hull moves for the predetermined time from the latest position at a same speed as the latest speed while maintaining the latest attitude.

According to this configuration, the pass-through position of the arm reference point after the predetermined time can be easily estimated.

Moreover, in the submersible vessel according to the modified example of the present embodiment, the controller sets a virtual location between two adjacent locations among the locations. Based on the positional information acquired by the position detector, the controller estimates the pass-through position of the arm reference point after the predetermined time. The controller controls the movable arm such that before the predetermined time elapses, the positional relation between the arm reference point and the inspection tool becomes the positional relation between the estimated pass-through position and the target point on or above the virtual location.

According to this configuration, when each of the update interval of the positional information and the command interval of the movable arm is shorter than the update interval of the location of the inspection target, the followability of the inspection tool with respect to the inspection target can be improved.

Moreover, in the submersible vessel according to the modified example of the present embodiment, the controller sets the virtual location on a straight line connecting the two adjacent locations.

According to this configuration, the virtual location can be set easily.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A submersible vessel comprising:
   a hull;
   a propulsor that propels the hull;
   a front sensor that sequentially detects locations of an elongated inspection target in front of the hull, the inspection target being disposed on a water bottom;
   a controller that controls the propulsor such that the hull passes through above the detected locations;
   a movable arm attached to an arm reference point of the hull;
   an inspection tool that is disposed at the movable arm and inspects the inspection target; and
   a position detector that acquires positional information including at least one of a position, an attitude, or a speed of the hull, wherein:
   based on the positional information acquired by the position detector, the controller estimates a pass-through position of the arm reference point after a predetermined time;
   the controller sets a virtual location between two adjacent locations among the locations;
   based on the positional information acquired by the position detector, the controller estimates the pass-through position of the arm reference point after the predetermined time; and
   the controller controls the movable arm such that before the predetermined time elapses, a positional relation between the arm reference point and the inspection tool becomes a positional relation between the estimated pass-through position and a target point on or above each location or on or above the virtual location.

2. The submersible vessel according to claim 1, wherein:
   the controller acquires a latest position, a latest attitude, and a latest speed of the hull from the position detector; and
   the controller estimates the pass-through position of the arm reference point after the predetermined time on an assumption that the hull moves for the predetermined time from the latest position at a same speed as the latest speed while maintaining the latest attitude.

3. The submersible vessel according to claim 1, wherein the controller sets the virtual location on a straight line connecting the two adjacent locations.

* * * * *